(12) United States Patent
Moore

(10) Patent No.: US 6,725,358 B1
(45) Date of Patent: Apr. 20, 2004

(54) PROCESSOR AND METHOD HAVING A LOAD REORDER QUEUE THAT SUPPORTS RESERVATIONS

(75) Inventor: Charles Robert Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 09/598,435

(22) Filed: Jun. 22, 2000

(51) Int. Cl.$^7$ .............................................. G06F 9/312
(52) U.S. Cl. ...................................................... 712/216
(58) Field of Search ............................... 712/225, 216, 712/217, 218; 711/155; 710/240

(56) References Cited

U.S. PATENT DOCUMENTS

| | | | |
|---|---|---|---|
| 5,664,215 A | * | 9/1997 | Burgess et al. ............... 712/23 |
| 5,694,568 A | | 12/1997 | Harrison, III et al. |
| 5,706,464 A | * | 1/1998 | Moore et al. ................ 711/122 |
| 5,742,785 A | * | 4/1998 | Stone et al. ................. 712/217 |
| 5,778,245 A | * | 7/1998 | Papworth et al. ............. 712/23 |
| 6,336,168 B1 | * | 1/2002 | Frederick et al. ............ 711/141 |
| 6,349,382 B1 | * | 2/2002 | Feiste et al. ................ 712/216 |
| 6,360,314 B1 | * | 3/2002 | Webb et al. ................. 712/219 |
| 6,370,625 B1 | * | 4/2002 | Carmean et al. ............. 711/152 |

* cited by examiner

Primary Examiner—Eddie Chan
Assistant Examiner—David J. Huisman
(74) Attorney, Agent, or Firm—Volel Emile; Bracewell & Patterson, L.L.P.

(57) ABSTRACT

A processor includes a register set, at least one execution unit that executes load instructions to transfer data into the register set, a load queue and associated queue management logic. The load queue contains a plurality of entries that each include a reservation valid field, and each of the plurality of entries is associated with a respective one of a corresponding plurality of load instructions that includes at least one load-reserve instruction. In response to execution of the load-reserve instruction, the queue management logic detects whether a data hazard exists by reference to the load queue, and if so, initiates correction of the data hazard. In addition, the queue management logic records a reservation for the load-reserve instruction by setting the reservation valid field of an entry in the load queue associated with the load-reserve instruction. Thus, the load queue, which is utilized to detect and correct data hazards resulting from out-of-order execution of load instructions, is also advantageously utilized to manage reservations.

18 Claims, 5 Drawing Sheets

PROCESSOR AND METHOD HAVING A LOAD REORDER QUEUE THAT SUPPORTS RESERVATIONS

CROSS-REFERENCE TO RELATED APPLICATION

The present application is related to co-pending U.S. application Ser. No. 09/598,434, which was filed on Jun. 22, 2000, and incorporated herein by reference.

BACKGROUND OF THE INVENTION

1. Technical Field

The present invention relates in general to data processing and, in particular, to processing load-reserve and store-conditional instructions within a processor. Still more particularly, the present invention relates to an out-of-order execution processor that simplifies the use of reservations by validating reservations by reference to a load reorder queue.

2. Description of the Related Art

In shared memory multiprocessor (MP) data processing systems, each of the multiple processors in the system may access and modify data stored in the shared memory. In order to synchronize access to a particular granule (e.g., cache line) of memory between multiple processors, load-reserve and store-conditional instructions are often employed. For example, load-reserve and store-conditional instructions have been implemented in the PowerPC™ user instruction set architecture (UISA) with opcodes associated with the LWARX and STWCX mnemonics, respectively.

In typical shared memory MP data processing systems that support load-reserve and store-conditional instructions, each processor within the system is equipped with a special-purpose reservation register. When a processor executes a load-reserve to a memory granule, the processor loads some or all of the contents of the memory granule into one of the processor's internal registers and the address of the memory granule into the processor's reservation register. The requesting processor is then said to have a reservation with respect to the memory granule. The processor may then perform an atomic update to the reserved memory granule utilizing a store-conditional instruction.

When a processor executes a store-conditional to a memory granule for which the processor holds a reservation, the processor stores the contents of a designated register to the memory granule and then clears the reservation. If the processor does not have a reservation for the memory granule, the store-conditional instruction fails, and the memory update is not performed. In either case, a condition register bit is set to indicate whether or not the store-conditional was successful. In general, the processor's reservation is cleared if a remote processor requests exclusive access to the memory granule for purposes of modifying it (the request is made visible to all processors on the shared bus) or the reserving processor executes a store instruction targeting the reserved memory granule. If only one reservation is permitted per processor, a processor's current reservation will also be cleared if the processor executes another load-reserve instruction.

The present invention recognizes that reservation management as described above has traditionally been handled by a special-purpose reservation register and associated register management logic. The use of this special-purpose structure complicates processor design, data flow, and verification. Accordingly, the present invention provides an improved processor and method for handling reservations that simplifies processor design, data flow, and verification.

SUMMARY OF THE INVENTION

In accordance with the present invention, a processor includes a register set, at least one execution unit that executes load instructions to transfer data into the register set, a load queue and associated queue management logic. The load queue contains a plurality of entries that each include a reservation valid field, and each of the plurality of entries is associated with a respective one of a corresponding plurality of load instructions that includes at least one load-reserve instruction. In response to execution of the load-reserve instruction, the queue management logic detects whether a data hazard exists by reference to the load queue, and if so, initiates correction of the data hazard. In addition, the queue management logic records a reservation for the load-reserve instruction by setting the reservation valid field of an entry in the load queue associated with the load-reserve instruction. Thus, the load queue, which is utilized to detect and correct data hazards resulting from out-of-order execution of load instructions, is also advantageously utilized to manage reservations.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
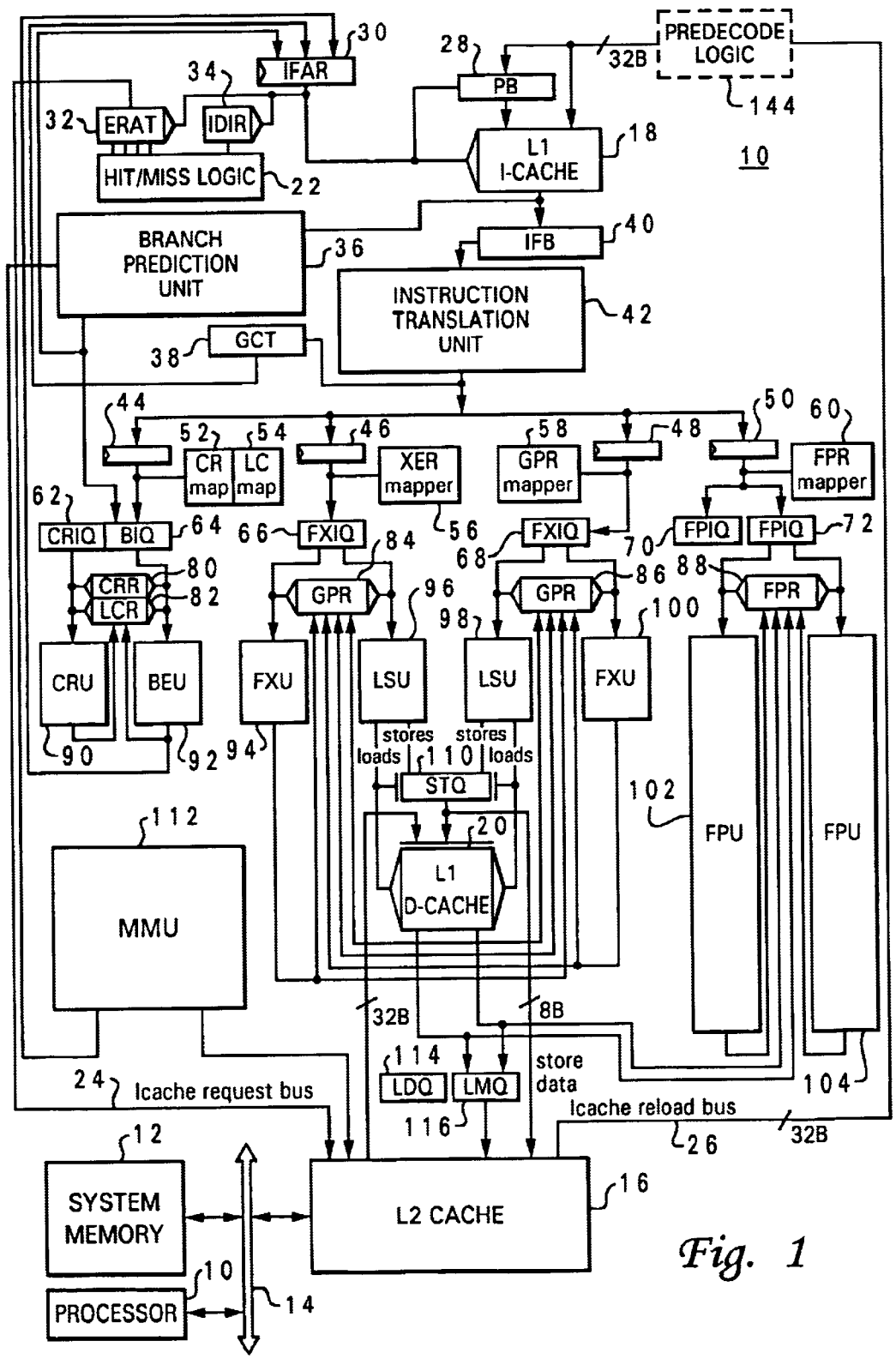
FIG. 1 depicts an illustrative embodiment of a data processing system with which the present invention may advantageously be utilized.

With reference now to the figures and in particular with reference to FIG. 1, there is depicted a high level block diagram of an illustrative embodiment of a processor, indicated generally at 10, for processing instructions and data in accordance with the present invention. In particular, processor 10 simplifies reservation management by maintaining reservations in a load data queue utilized to reorder possibly out-of-order load operations.

Processor 10 comprises a single integrated circuit superscalar processor, which, as discussed further below, includes various execution units, registers, buffers, memories, and other functional units that are all formed by integrated circuitry. As illustrated in FIG. 1, processor 10 may be coupled to other devices, such as a system memory 12 and a second processor 10, by an interconnect fabric 14 to form a larger data processing system such as a workstation computer system. Processor 10 also includes an on-chip multi-level cache hierarchy including a unified level two (L2) cache 16 and bifurcated level one (L1) instruction (I) and data (D) caches 18 and 20, respectively. As is well-known to those skilled in the art, caches 16, 18 and provide low latency access to cache lines corresponding to memory locations in system memory 12.

Instructions are fetched for processing from L1 I-cache 18 in response to the effective address (EA) residing in instruction fetch address register (IFAR) 30. During each cycle, a new instruction fetch address may be loaded into IFAR 30 from one of three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. If hit/miss logic 22 determines, after translation of the EA contained in IFAR 30 by effective-to-real address translation (ERAT) 32 (or memory management unit (MMU) 112) and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns. In response to a request address, L2 cache 16 outputs a cache line of instructions, which are loaded into prefetch buffer (PB) 28 and L1 I-cache 18 via I-cache reload bus 26, possibly after passing through optional predecode logic 144.

Once the cache line specified by the EA in IFAR resides in L1 cache 18, L1 I-cache 18 outputs the, cache line to both branch prediction unit (BPU) 36 and to instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more registers within a register file by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically (i.e., possibly out-of-order) to the execution units of processor 10 for execution. The instructions, however, are maintained in issue queues 6272 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUS) 94 and 100 for executing fixed-point instructions, two load-store units (LSUs) 96 and 98 for executing load and store instructions, and two floating-point units (FPUs) 102 and 104 for executing floating-point instructions. Each of execution units 90–104 is preferably implemented as an execution pipeline having a number of pipeline stages.

During execution within one of execution units 90–104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the appropriate mapper, which sets an indication to indicate that the register file register(s) assigned to the instruction now contains the architected state of the register. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, no further processing is required. If, however, the calculated path address does not match the predicted path address, BEU 92 supplies the correct path address to IFAR 30. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12. As described in detail below, LDQ 114 ensures that data hazards are detected and appropriate remedial action is taken such that the later of two load instructions targeting the same address does not receive older data than the earlier of the two load instructions. In addition, operations that could invalidate a reservation are snooped against load-reserve operations recorded in LDQ 114, thus advantageously utilizing LDQ 114 to support reservation management without the use of dedicated reservation hardware.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

Figure 2:
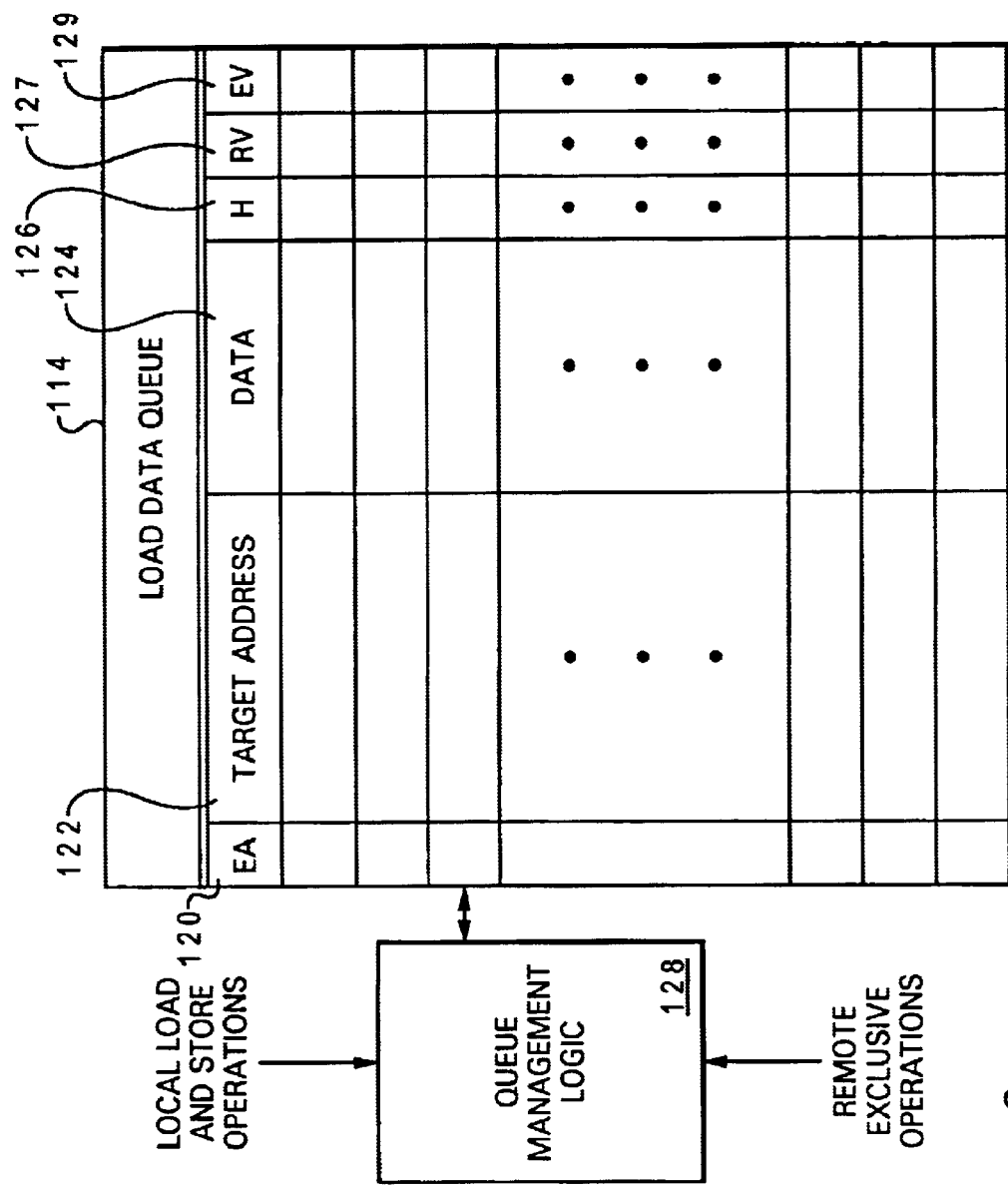
FIG. 2 is a more detailed block diagram of an exemplary embodiment of the load data queue (LDQ) illustrated in FIG. 1.

Referring now to FIG. 2, there is depicted a more detailed block diagram of an exemplary embodiment of LDQ 114. As illustrated, LDQ 114 includes a number of entries, each including an effective address (EA) field 120 for storing the effective address (of address tag portion thereof) of a load instruction, a target address field 122 for storing the target address (or address tag portion thereof) from which the load instruction obtains data, a data field 124 for storing data loaded from memory by a load instruction, a hazard (H) field 126 for indicating that a hazard may exist for a load instruction, a reservation valid (RV) field 127 indicating whether processor 10 has a reservation for the target address, and an entry valid (EV) bit indicating whether or not the entry is currently allocated. Entries within LDQ 114 are preferably allocated, updated, and deallocated by associated queue management logic 128 in accordance with the processes depicted in FIGS. 3A and 3B.

Figure 3A:
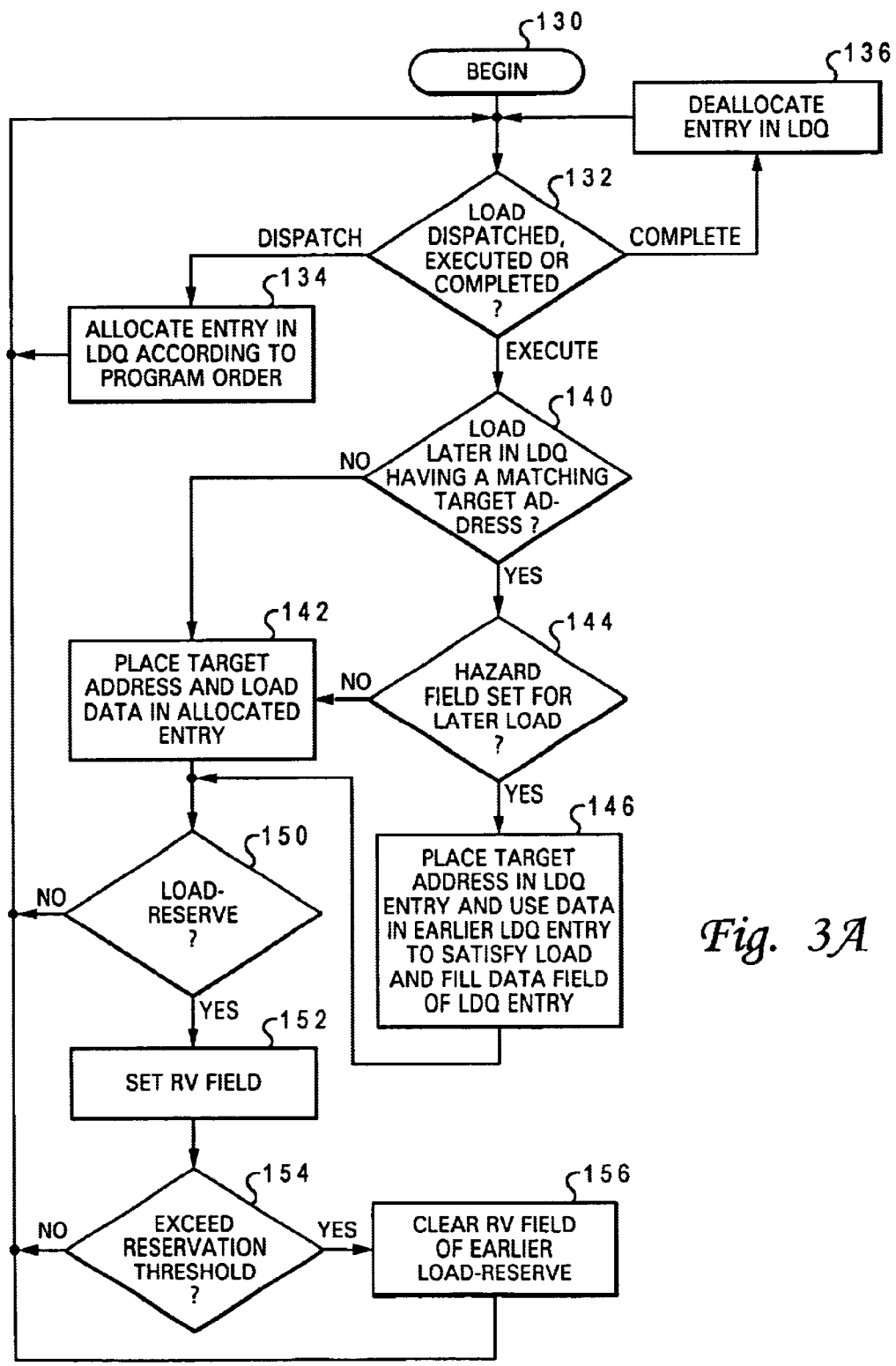
FIG. 3A is a high level logical flowchart of an exemplary method by which the queue management logic shown in FIG. 2 updates the LDQ in response to various stages in the processing of local load operations.

With reference now to FIG. 3A, there is illustrated a high level logical flowchart of an exemplary method by which queue management logic 128 of FIG. 2 manages LDQ 114 in response to various stages in the local processing of load operations. As shown, the process begins at block 130 and then proceeds to block 132 in response to queue management logic 128 receiving a notification that a load instruction (which may be a load-reserve instruction) has been processed at some stage of the execution pipeline between dispatch and completion. In response to this notification, queue management logic 128 determines at block 132 whether the load instruction has been dispatched, executed or completed by processor 10.

In response to a determination that the load instruction has been dispatched from ITU 42 to one of latches 46 and 48, as described above, the process proceeds to block 134. Block 134 depicts queue management logic 128 allocating an entry in LDQ 114 for the newly dispatched instruction in accordance with the program order of the load instruction, placing the EA of the instruction within EA field 120, and setting EV bit 129. Thus, the location of an entry of a load instruction within LDQ 114 preferably indicates the program ordering of the load instruction with respect to other load instructions. Of course, the program ordering of the load instructions may alternatively be indicated by an additional field in LDQ 114. Thereafter, the process returns to block 132.

Returning to block 132, in response to a determination that a load instruction has been completed (together with other instructions in its instruction group) by GCT 38, queue management logic 128 deallocates the entry corresponding to the completed load instruction as shown at block 136, for example, by identifying an entry having a matching EA and then resetting EV bit 129 of the matching entry. Thereafter, the process returns to block 132. In order to prevent the premature deallocation of entries allocated to load-reserve instructions, queue management logic 128 preferably deallocates an entry only if both EV bit 129 and RV bit 127 are reset to zero.

If, on the other hand, queue management logic 128 determines from the received notification at block 132 that a load instruction has been executed by one of LSUs 96 and 98, the process proceeds to block 140, which illustrates queue management logic 128 determining whether an entry in LDQ 114 later in program order than the entry allocated to the executed load instruction has a target address in its target address field 122 that matches the target address of the executed load instruction.

If not, queue management logic 128 places the target address of the executed load instruction in the target address field 122 of the associated entry and places the data retrieved from memory (i.e., local cache, remote cache, or system memory 12) in response to execution of the load instruction in data field 124 of the associated entry and the indicated registers, as shown at block 142. The entry associated with the executed load instruction is also updated, as depicted at block 142, even if an entry associated with a later load instruction has a matching address if a determination is made at block 144 that hazard field 126 of the matching entry is not set. However, if hazard field 126 of the matching entry is set, a data hazard is detected, and the process proceeds to block 146.

Referring now to block 146, to correct for a data hazard detected according to the conditions illustrated in blocks 140 and 144, queue management logic 128 places the target address for the executed load instruction in target address field 122 of the associated entry and utilizes the data contained in data field 124 of the matching entry of the later-in-program-order load to satisfy the earlier-in-program-order, but later executed load instruction. That is, the data from data field 124 of the matching entry is provided to the register(s) specified by the executed load instruction (e.g., one of GPRs 84 and 86) and is also placed into data field 124 of the entry in LDQ 114 associated with the executed load instruction. RV field 127 is also set if the executed load instruction is a load-reserve instruction. Thus, the operation of queue management logic 128 minimizes the performance penalty associated with data hazards since no instructions are flushed or re-executed for the executed load instruction to obtain the correct data (i.e., the same data as the later-in-program-order but earlier executed load instruction).

Following either block 142 or block 146, the process proceeds to block 150, which depicts a determination of whether or not the currently executed load instruction is a load-reserve instruction. If not, the process simply returns to block 132, which is described above. However, in response to a determination at block 150 that the executed load instruction is a load-reserve instruction, the process proceeds to block 152, which illustrates queue management logic 128 setting RV field 127 of the entry in LDQ 114 allocated to the load-reserve instruction. As shown at blocks 154 and 156, if the reservation indicated by RV field 127 causes processor 10 to exceed a predetermined maximum number of outstanding reservations, queue management logic 128 clears RV field 127 of the earliest in program order load-reserve instruction still outstanding. If the reservation threshold is not exceeded by the new reservation, the process simply returns from block 154 to block 132. Of course in alternative implementations in which only a single reservation is permitted, any other set RV field 127 is reset by the execution of the new load-reserve instruction.

Figure 3B:
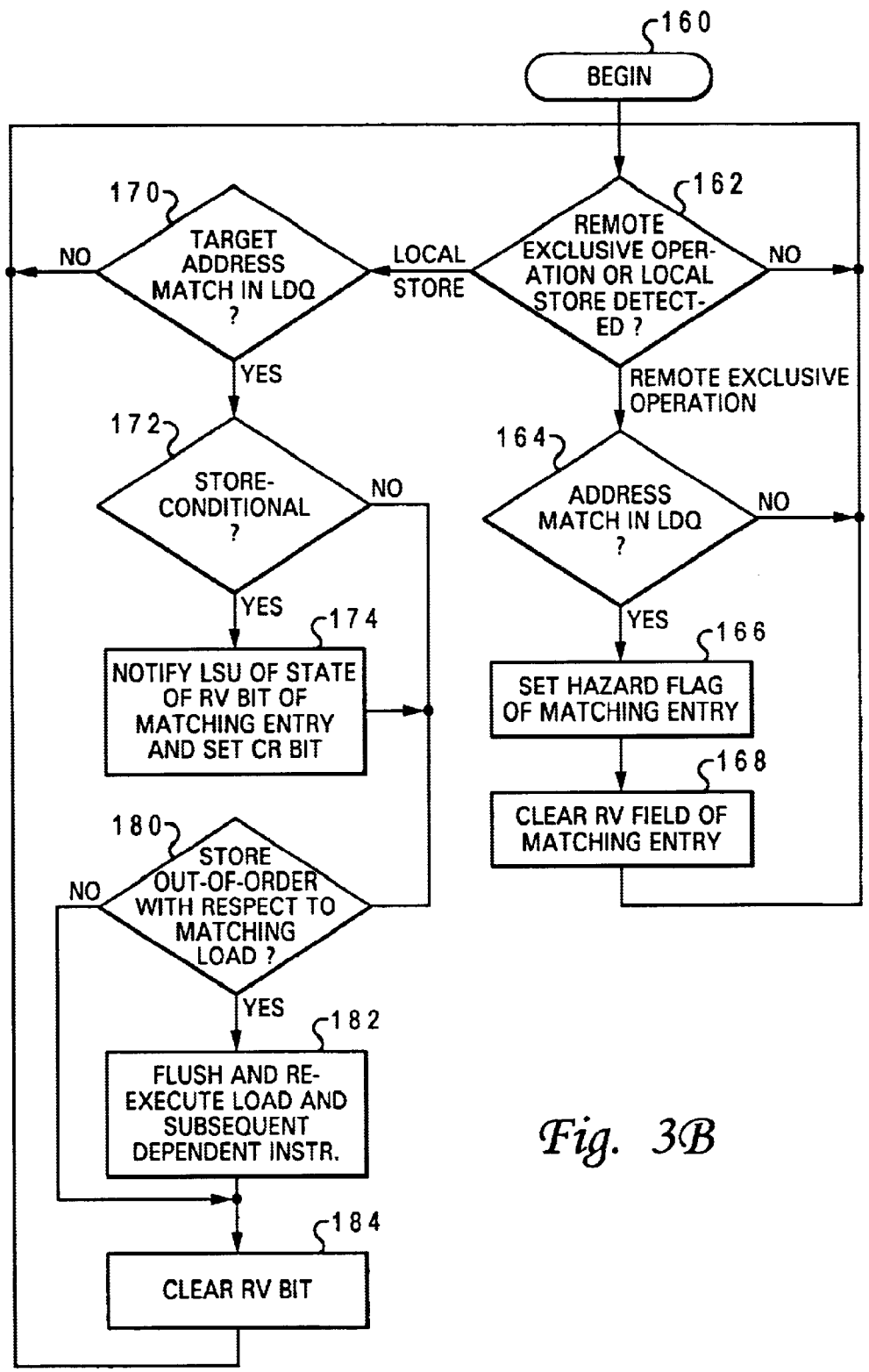
FIG. 3B is a high level logical flowchart of an exemplary method by which the queue management logic of FIG. 2 responds to notifications of local store operations and remote exclusive operations.

Referring now to FIG. 3B, there is depicted a high level logical flowchart of an exemplary method by which queue management logic 128 of FIG. 2 updates hazard fields 126 and RV fields 127 of LDQ 114 in response to detecting remote exclusive operations and handles data hazards caused by out-of-order local execution of store instructions. As depicted, the process begins at block 160 and then iterates at block 162 until notification is received of a locally processed store instruction or of an exclusive access (e.g., read-with-intent-to-modify, flush or kill) request on interconnect fabric 14 made by a remote processor 10. In response to receipt of notification of local processing of a store instruction, the process proceeds to block 170, which is described below. However, in response to receipt of notification of an exclusive access request by a remote processor 10, the process proceeds from block 162 to block 164, which illustrates queue management logic 128 determining whether or not a target address specified by the exclusive access request matches the target address contained in target address field 122 of any entry within LDQ 114. If not, the process simply returns to block 162, which has been described.

However, in response to a determination that the target address of the exclusive address request matches the address contained in the target address field 122 of an entry in LDQ 114, queue management logic 128 sets hazard field 126 of the matching entry, as shown at block 166, to indicate the existence of a possible data hazard for any earlier-in-program-order load instruction executed after the load instruction associated with matching entry. The existence of an actual data hazard is detected at blocks 140 and 144 of FIG. 3A for those caused by remote exclusive operations and at blocks 180–182 for those caused by locally executed store instructions.

Following block 166, the process proceeds to block 168, which illustrates queue management logic 128 clearing RV field 127 of the matching entry, if RV field 127 is set. Thus, reservations obtained by load-reserve instructions are cleared by queue management logic 128 in response to notification of a remote exclusive access operation having a matching target address. Following block 168, the process depicted in FIG. 3B returns to block 162.

Referring now to block 170 in response to receipt by queue management logic 128 of notification of a local execution of a store instruction (including a store-conditional instruction), queue management logic 128 determines whether or not the target address of the locally-executed store instruction matches target address field 122 of any entry in LDQ 114. If not, the process returns to block 162. However, in response to a determination the target address of the store instruction matches a target address specified in LDQ 114, the process passes through block 172 to block 174 if the store instruction is a store-conditional, and passes through block 172 to block 180 if the store instruction is not a store conditional.

There are several possible reservation management schemes that queue management logic 128 can implement, depending upon the desired behavior and program model. In a precise implementation, such as that depicted at block 174, queue management logic 128 permits store-conditional instructions to successfully update memory if a reservation is currently held for the target address specified by the store-conditional instruction, that is, if RV bit 127 is set in the matching entry identified at block 170. In an imprecise implementation of reservation management, queue management logic 128 may alternatively permit the store-conditional instruction to update memory if RV bit 127 is set in any entry of LDQ 114. Thus, in this alternative embodiment, a target address match as shown at block 170 would not be a condition precedent to successful completion of a store-conditional instruction, and the memory update indicated by a store-conditional would be performed if a reservation for any address is held. As with any design choice, these different reservation management schemes each have attendant advantages and disadvantages. For example, a precise implementation of reservation management is typically easier to debug and analyze, while an imprecise implementation promotes a more streamlined data flow in that a determination of whether a store conditional is permitted to complete successfully can be made by simply ORing together RV bits 127 rather than by performing a full address compare.

Regardless of which reservation management scheme is implemented by queue management logic 128, following examination of the appropriate RV bit(s) 127, queue management logic 128 notifies the appropriate one of LSUs 96 and 98 whether or not the store-conditional is allowed to update memory, as indicated at block 174. Without receiving notification of a valid reservation in LDQ 114, LSU 96 or 98 will not allow the store-conditional instruction to update memory. In addition, either the relevant one of LSUs 96 and 98 or queue management logic 128 sets a condition register bit in CRR 80 to indicate whether the store-conditional was successful. In many cases, for example, for the lock primitive:

A LWARX /load-reserve at address A/
       . . . /possible intervening instructions/
       STWCX /store-conditional dependent upon the existence of a reservation/
       BC A /branch conditional that branches to address A if the condition register bit indicates that STWCX was not successful/ the load-reserve instruction will be executed until the store-conditional instruction successfully updates memory.

Following either block 174 or block 172, the process proceeds to block 180, which illustrates queue management logic 128 determining whether or not the locally executed store instruction (which may be a store-conditional) has been executed out-of-order with respect to a later-in-program-order but earlier executed load instruction having the same target address (i.e., whether a data hazard has occurred). If not, the process proceeds directly to block 184. However, if a data hazard is detected, queue management logic 128 initiates the flush and re-execution of the load instruction and any later in program order instructions that are dependent upon the load instruction, as shown at block 182. Following either block 180 or block 182, the process proceeds to block 184, which depicts queue management logic 128 clearing the RV bit 127 of the matching entry identified at block 170 (for a precise implementation of reservation management) or all RV bits 127 in LDQ 114 (for an imprecise implementation of reservation management). Thereafter, the process returns to block 162, which has been described.

Figure 4A:
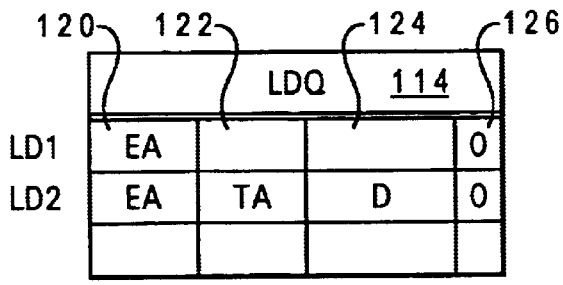
FIGS. 4A–4C are three views of LDQ 114 that together illustrate an exemplary operating scenario in which a data hazard is detected and corrected in accordance with the present invention.
Figure 4B:
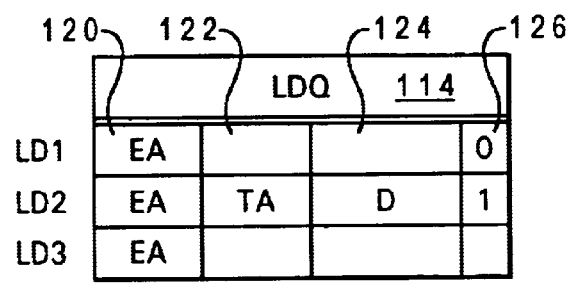
Figure 4C:
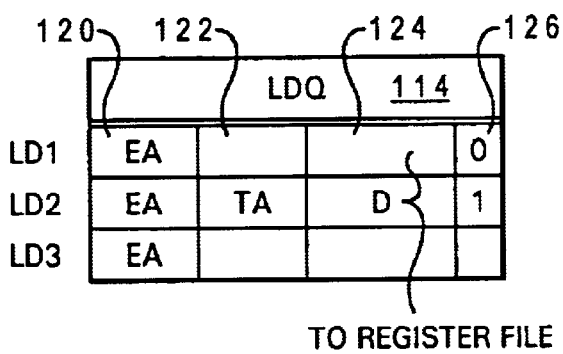

With reference now to FIGS. 4A–4C, there are illustrated three block diagrams that together illustrate an exemplary operating scenario in which a data hazard caused by a remote exclusive operation is detected and corrected in accordance with the present invention. Referring first to FIG. 4A, when the operating scenario begins, two load instructions, which are designated LD1 and LD2 in program order (with LD2 being the latest in program order), have been dispatched and accordingly have been allocated entries in LDQ 114 by queue management logic 128. In addition, LD2 has been executed out-of-order with respect to LD1, and the target address (TA) and data (D) have been loaded into the appropriate entry of LDQ 114 by queue management logic 128. The hazard field 126 of the entry associated with each of the load instructions is reset to 0.

Next, as shown in FIG. 4B, in response to queue management logic 128 receiving notification of a remote request for exclusive access having a target address that matches the TA of LD2, hazard field 126 of the entry associated with LD2 is set to 1. Then, as indicated in FIG. 4C, when LD1 is executed out-of-order and the execution generates a target address matching the TA specified in target address field 124 of the entry associated with LD2, a data hazard is detected. Accordingly, queue management logic 128 provides the data from data field 124 of the entry corresponding to LD2 to the register file to satisfy LD1 and also records the data in data field 124 and records the target address in target address field 122 of the entry corresponding to LD1. Thus, a data hazard caused by a remote exclusive operation intervening between out-of-order executed loads is detected and correctly without flushing or re-executing any instructions and without any additional latency.

As has been described, the present invention provides a processor and method of reservation management that employ a load data queue utilized to detect data hazards resulting from out-of-order execution of load instructions to also manage reservations. The use of the load data queue to manage reservations simplifies processor design, data flow, and verification as compared to conventional processors that implement special-purpose reservation hardware.

While the invention has been particularly shown and described with reference to a preferred embodiment, it will be understood by those skilled in the art that various changes in form and detail may be made therein without departing from the spirit and scope of the invention.

What is claimed is:

1. A processor, comprising:
   a register set;
   a load queue containing a plurality of entries that each includes a reservation valid field, a target address field, and an associated hazard flag indicative of a possible data hazard, wherein each of said plurality of entries is associated with a respective one of a corresponding plurality of load instructions executed by the processor and at least one of said plurality of load instructions is a load-reserve instruction;
   at least one execution unit that executes load instructions to transfer data into said register set;
   queue management logic that, responsive to execution of said load-reserve instruction, detects by reference to said load queue whether a data hazard exists, and if so, initiates correction of said data hazard, wherein said queue management logic records a reservation for said load-reserve instruction by setting the reservation valid field of an entry in said load queue associated with said load-reserve instruction, and wherein said queue management logic detects that a data hazard exists for said load-reserve instruction if a target address of said load-reserve instruction matches a target address specified in the target address field of an entry in said load queue that has its hazard flag set and that is associated with another load instruction following said load-reserve instruction in program ordering; and
   wherein each entry in said load queue includes a data field that buffers load data obtained by execution of the associated load instruction, and wherein said queue management logic, responsive to detection of said data hazard, corrects said data hazard by outputting said load data retrieved by said another load instruction from said data field to said register set in accordance with said load-reserve instruction.

2. The processor of claim 1, wherein said queue management logic, responsive to detection of said data hazard, initiates re-execution of at least said another load instruction.

3. The processor of claim 1, wherein said queue management logic sets the hazard flag of an entry allocated to the another load instruction at least in response to an earlier in program order but later executed local store operation specifying a target address matching a target address contained in the entry's target address field.

4. The processor of claim 1, wherein said queue management logic clears said reservation valid field in response to at least a store instruction or a remote access request having a target address matching a target address of said load-reserve instruction.

5. The processor of claim 1, wherein said queue management logic allocates a respective entry within said load queue to each load instruction upon dispatch and, upon completion of said each load instruction, deallocates said respective entry.

6. The processor of claim 1, wherein said at least one execution unit executes said another load instruction prior to said load-reserve instruction.

7. A data processing system, comprising:
   an interconnect fabric;
   a memory coupled to said interconnect fabric;
   a register set;
   at least one execution unit that executes load instructions to transfer data into said register set;
   a load queue containing a plurality of entries that each includes a reservation valid field, a target address field and an associated hazard flag indicative of a possible data hazard, wherein each of said plurality of entries is associated with a respective one of a corresponding plurality of load instructions executed by said at least one execution unit to transfer data into said register set and at least one of said plurality of load instructions is a load-reserve instruction;

queue management logic that, responsive to execution of said load-reserve instruction, detects by reference to said load queue whether a data hazard exists, and if so, initiates correction of said data hazard, wherein said queue management logic records a reservation for said load-reserve instruction by setting the reservation valid field of an entry in said load queue associated with said load-reserve instruction, and wherein said queue management logic detects that a data hazard exists for said load-reserve instruction if a target address of said load-reserve instruction matches a target address specified in the target address field of an entry in said load queue that has its hazard flag set and that is associated with another load instruction following said load-reserve instruction in program order; and wherein each entry in said load queue includes a data field that buffers load data obtained by execution of the associated load instruction, and wherein said queue management logic, responsive to detection of said data hazard, corrects said data hazard by outputting said load data retrieved by said another load instruction from said data field to said register set in accordance with said load-reserve instruction.

8. The data processing system of claim 7, wherein said queue management logic, responsive to detection of said data hazard, initiates re-execution of at least said another load instruction.

9. The data processing system of claim 7, wherein said queue management logic sets the hazard flag of an entry allocated to the another load instruction at least in response to an earlier in program order but later executed local store operation specifying a target address matching a target address contained in the entry's target address field.

10. The data processing system of claim 7, wherein said queue management logic clears said reservation valid field in response to at least a store instruction or a remote access request having a target address matching a target address of said load-reserve instruction.

11. The data processing system of claim 7, wherein said queue management logic allocates a respective entry within said load queue to each load instruction upon dispatch and, upon completion of said each load instruction, deallocates said respective entry.

12. The data processing system of claim 7, wherein said at least one execution unit executes said another load instruction prior to said load-reserve instruction.

13. A method of executing load-reserve instructions in a processor supporting out-of-order execution, said processor having a register set and a load queue containing a plurality of entries, said method comprising:

allocating each of a plurality of entries within said load queue to a respective one of a corresponding plurality of load instructions executed within the processor, wherein each of said plurality of entries includes a reservation valid field, a target address field, a data field that buffers load data obtained by execution of the associated load instruction, and an associated hazard flag indicative of a possible data hazard, and wherein at least one of said plurality of load instructions is a load-reserve instruction;

executing said plurality of load instructions to transfer data from memory into said register set; and in response to execution of said load-reserve instruction:
  detecting by reference to said load queue whether a data hazard exists, and if so, initiating correction of said data hazard, wherein said detecting comprises detecting if a target address of said load-reserve instruction matches a target address specified in the target address field of an entry in said load queue that has its hazard flag set and that is associated with another load instruction following said load-reserve instruction in program order, and wherein said initiating correction of said data hazard comprises outputting said load data retrieved by said another load instruction from a data field of said load queue to said register set in accordance with said load-reserve instruction; and
  recording a reservation for a target address specified by said load-reserve instruction by setting the reservation valid field of an entry in said load queue associated with said load-reserve instruction.

14. The method of claim 13, wherein initiating correction of said data hazard comprises initiating re-execution of at least said another load instruction.

15. The method of claim 13, and further comprising setting the hazard flag of an entry allocated to the another load instruction at least in response to detecting an earlier in program order but later executed local store operation specifying a target address matching a target address contained in the entry's target address field.

16. The method of claim 13, and further comprising clearing said reservation valid field in response to at least a store instruction or a remote access request having a target address matching a target address of said load-reserve instruction.

17. The method of claim 13, wherein allocating said plurality of entries comprises allocating each of said plurality of entries upon dispatch of a respective associated load instruction, and wherein said method further comprises deallocating each of said plurality of entries upon completion of a respective associated load instruction.

18. The method of claim 13, wherein said executing comprises executing said another load instruction prior to said load-reserve instruction.

* * * * *